(12) United States Patent
Hinz et al.

(10) Patent No.: US 8,480,184 B2
(45) Date of Patent: Jul. 9, 2013

(54) MOTORCYCLE BRAKING SYSTEM

(75) Inventors: Axel Hinz, Neu-anspach (DE); Günther Vogel, Dreieich (DE)

(73) Assignee: Continental Teves AG & Co. oHG (DE)

( * ) Notice: Subject to any disclaimer, the term of this patent is extended or adjusted under 35 U.S.C. 154(b) by 1269 days.

(21) Appl. No.: 12/301,114

(22) PCT Filed: May 11, 2007

(86) PCT No.: PCT/EP2007/054586
§ 371 (c)(1),
(2), (4) Date: Nov. 17, 2008

(87) PCT Pub. No.: WO2007/131960
PCT Pub. Date: Nov. 22, 2007

(65) Prior Publication Data
US 2009/0184567 A1  Jul. 23, 2009

(30) Foreign Application Priority Data

May 17, 2006 (DE) .......................... 10 2006 023 341
Sep. 23, 2006 (DE) .......................... 10 2006 045 038

(51) Int. Cl.
*B60T 8/32* (2006.01)
(52) U.S. Cl.
USPC ........................................... 303/137; 303/11

(58) Field of Classification Search
USPC ................ 303/9.64, 10, 11, 137, 189, 113.1, 303/113.5, 115.4, 116.1; 60/459, 486
See application file for complete search history.

(56) References Cited

U.S. PATENT DOCUMENTS

| | | | |
|---|---|---|---|
| 5,383,718 | A | 1/1995 | Burgdorf et al. |
| 2002/0125764 | A1 | 9/2002 | Sakamoto |
| 2006/0082216 | A1 | 4/2006 | Hamm et al. |
| 2007/0252429 | A1 | 11/2007 | Lerchenberger et al. |

FOREIGN PATENT DOCUMENTS

| | | |
|---|---|---|
| DE | 102 09 984 A1 | 10/2002 |
| EP | 1 277 635 A2 | 1/2003 |
| EP | 1 650 093 A1 | 4/2006 |
| WO | WO 92/05990 | 4/1992 |
| WO | WO 2006/040261 A1 | 4/2006 |
| WO | WO 2006/040262 A1 | 4/2006 |

*Primary Examiner* — Robert A Siconolfi
*Assistant Examiner* — Vu Q Nguyen
(74) *Attorney, Agent, or Firm* — RatnerPrestia

(57) ABSTRACT

A hydraulic motorcycle braking system is disclosed. In the hydraulic motorcycle braking system a pump suction valve, which is situated in a braking circuit that does not contain an isolating valve or a change-over valve, has a higher opening pressure than a pump suction valve which is situated in a braking circuit provided with an isolating valve and a change-over valve. Accordingly, pressure oscillations initiated during the start-up of the pump cannot have a retroactive effect or only have a slight retroactive effect on the actuated brake master cylinder.

16 Claims, 4 Drawing Sheets

MOTORCYCLE BRAKING SYSTEM

CROSS REFERENCE TO RELATED APPLICATIONS

This application is the U.S. national phase application of PCT International Application No. PCT/EP2007/054586, filed May 11, 2007, which claims priority to German Patent Application No. DE102006023341.7, filed May 17, 2006 and German Patent Application No. DE102006045038.8, filed Sep. 23, 2006, the contents of such applications being incorporated by reference herein.

BACKGROUND OF THE INVENTION

1. Field of the Invention

The invention relates to a motorcycle brake system.

2. Description of the Related Art

EP 1 277 635 A2 has already disclosed a motorcycle brake system of said type. The brake system has a hydraulically actuable front wheel brake circuit and rear wheel brake circuit, with each individual brake circuit being connected either to a foot-actuated or hand-actuated master brake cylinder. For brake slip regulation, electromagnetically activatable inlet and outlet valves are arranged in the front wheel brake circuit and rear wheel brake circuit, with a pump for building up pressure in the two brake circuits. The rear wheel brake circuit has an additional valve arrangement which, in the event of a manual actuation of the front wheel brake circuit, permits a simultaneous build-up of pressure at the rear wheel brake by means of the pump without it being necessary for the master brake cylinder of the rear wheel brake circuit to be actuated.

A first pressure sensor is arranged at the front wheel brake circuit in order to detect the manual actuation of the front wheel brake circuit and in order to be able to activate the pump to build up an autonomous brake pressure in the rear wheel brake circuit.

Depending on the reliable detection of the master brake cylinder pressure in the front wheel brake circuit, the pump can then be electrically activated, and a regulated brake pressure can be built up in the rear wheel brake.

As the pump starts up, however, there is the problem that pressure fluctuations are initiated which feed back to the manually actuated master brake cylinder, and are perceptible in the hand brake lever, which is displeasing.

SUMMARY OF THE INVENTION

It is an object of the present invention to improve a motorcycle brake system of the known type in such a way that the pressure fluctuations which are initiated as the pump starts up cannot feed back, or can feed back only slightly, to the manually actuated master brake cylinder.

According to one aspect of the invention, in the braking system a pump suction valve, which is situated in a braking circuit that does not contain an isolating valve or a change-over valve, has a higher opening pressure than a pump suction valve which is situated in a braking circuit provided with an isolating valve and a change-over valve.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
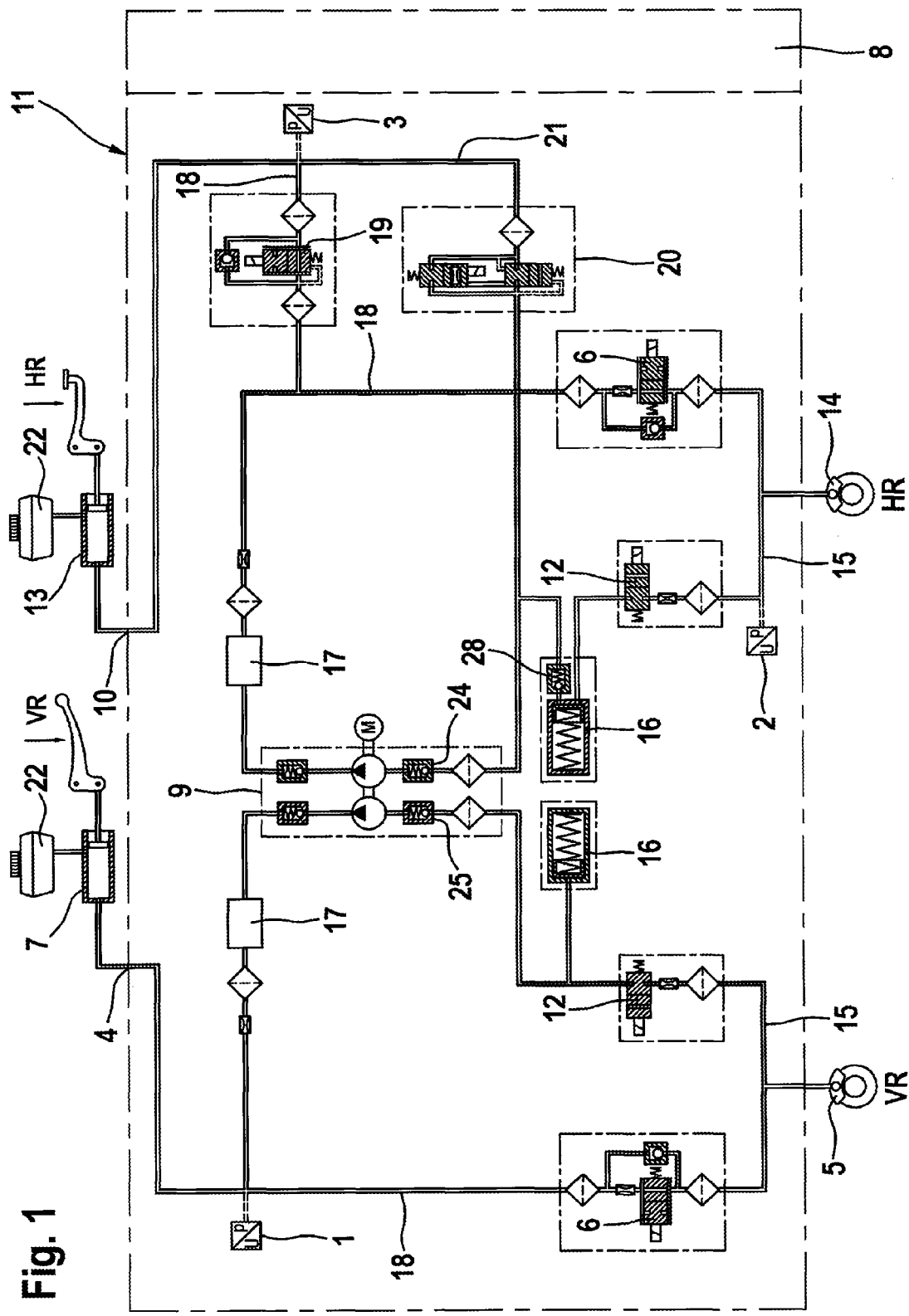
FIG. 1 shows the hydraulic circuit diagram for a motorcycle brake system which is improved with respect to the prior art and whose front wheel brake circuit, during autonomous operation of the rear wheel brake as a result of an increase in the opening pressure at the pump suction valve, is not subjected, or is subjected only slightly, to feedback from the pump to the hand brake lever.

FIG. 1 shows the hydraulic circuit diagram of an improved, new motorcycle brake system in schematic form. The brake system is composed of a hydraulically actuable front wheel brake circuit 4 and rear wheel brake circuit 10, having in each case one master brake cylinder 7 which is connected to the front wheel brake circuit 4 and can be actuated proportionally by hand force, and having a master brake cylinder 13, which can be actuated in proportion to a foot force, on the rear wheel brake 14. Master brake cylinders 7 and 13 are each connected to a fluid reservoir 22.

For brake slip regulation, electromagnetically actuable inlet and outlet valves 6, 12 are arranged in both the front wheel brake circuit 4 and in the rear wheel brake circuit 10, wherein in each case the inlet valve 6 which is open in the home position is arranged in the brake line 18 of the front wheel brake circuit 4 or of the rear wheel brake circuit 10, which brake line 18 connects the respectively associated master brake cylinder 7, 13 to the front wheel brake 5 or the rear wheel brake 14. The outlet valve 12 which is closed in the home position is arranged in each case in a return line 15 of each brake circuit, which return line 15 connects the front wheel brake 5 or rear wheel brake 14 in each case to a low pressure accumulator 16 and to the suction side of a pump 9 which is divided into two circuits and which operates according to the feedback principle. The pump 9 is therefore connected via noise damping chambers 17, which are arranged in the two brake circuits, to the brake lines 18 upstream of the inlet valves 6, so as to ensure that the brake fluid volume which is respectively let out from the front wheel brake 5 or rear wheel brake 14 is fed back according to demand.

The rear wheel brake circuit 10 has, in addition to the illustrated features of the front wheel brake circuit 4, an electromagnetically actuable cut-off valve 19 which is arranged in the brake line 18 between the master brake cylinder 13 and the inlet valve 6, which cut-off valve 19 is open in its home position. Furthermore, between the cut-off valve 19 and the master brake cylinder 13, a suction path 21, which leads via an electric switching valve 20, to the pump 9 is connected to the brake line 18 of the rear wheel brake circuit 10, as a result of which the pump part which acts in the rear wheel brake circuit 10 can, in the event of the electrical excitation of the switching valve 20, extract pressure medium from the master brake cylinder 13 and supply said pressure medium to the rear wheel brake 14 for an autonomous build-up of pressure in the rear wheel brake 14, while the cut-off valve 19 remains in its electrically excited blocking position in order to prevent a feedback into the master brake cylinder 13.

To detect the master brake cylinder pressure supplied to the front wheel brake circuit 4, a first pressure sensor 1 is situated upstream of the inlet valve 6 on the brake line 18 of the front wheel brake circuit 4. To detect the wheel brake pressure in the rear wheel brake circuit 10, a second pressure sensor 2 is connected to the rear wheel brake circuit downstream of the inlet valve 6, and a third pressure sensor upstream of the cut-off valve 19, as a result of which the actuation of the master brake cylinder 13 can also be reliably detected.

By means of the inlet valves 6, it is possible, in the two-circuit brake system, for the brake pressure generated in the brake lines 18 to be limited at all times. The build-up of brake pressure in the wheel brakes takes place by means of the outlet valves 12, which can be opened under the action of an electromagnet, in the direction of the two low-pressure accumulators 16. The details in this regard can be gathered from the functional description regarding brake slip regulation in one of the following sections of the description.

The master brake cylinder pressure detected by means of the first pressure sensor 1 in the front wheel brake circuit 4 forms the reference variable for the electric activation of the pump 9 which acts in the rear wheel brake circuit 10 and which, in interaction with the inlet and outlet valves 6, 12, the cut-off valve 19 and switching valve 20, brings about an electrohydraulic build-up of brake pressure in the rear wheel brake circuit 10 according to an electronic brake force distribution characteristic curve, which is stored in the control unit 8, if only the master brake cylinder 7 which is connected to the front wheel brake circuit 4 is actuated.

To evaluate the pressure sensor signals, a logic circuit is provided in the electronic control unit 8, in which logic circuit an autonomous hydraulic pressure in the rear wheel brake circuit 10 is generated by means of the electrically actuable pump 9 as a function of the result of the evaluation of the pressure sensor signals.

The symbolically illustrated control unit 8 forms an integral part of a brake unit 11 which is preferably plugged, so as to make electrical contact, onto the pressure sensors which are integrated in the brake unit 11 and onto the inlet and outlet valves 6, 11 which are integrated therein. The brake unit 11 may therefore, on account of the particularly compact design, be fastened to a motorcycle frame in the vicinity of a battery.

It is basically the case that:

1. A locking tendency of the front wheel or rear wheel is reliably detected by means of wheel speed sensors (not shown) and the evaluation of their signals in the control unit. The inlet valve 6 which is arranged in the front wheel brake circuit 4 or in the rear wheel brake circuit 10 is closed electromagnetically by means of the control unit 8 in order to prevent a further build-up of pressure in the front wheel brake circuit 4 or rear wheel brake circuit 10.

2. If, to reduce the locking tendency, a further dissipation of pressure in the front wheel brake circuit 4 or rear wheel brake circuit 10 is necessary, this is obtained by opening the outlet valve 12 which can be connected in each case to the low-pressure accumulator 16 and which is normally closed in the currentless state. The outlet valve 12 is closed once the wheel acceleration rises beyond a certain value again. In the pressure dissipation phase, the corresponding inlet valve 6 remains closed, such that the master brake cylinder pressure which is generated in the front wheel brake circuit 4 or rear wheel brake circuit 10 respectively cannot propagate to the front wheel brake circuit or rear wheel brake circuit 10 respectively.

3. If the determined slip values again permit a pressure build-up in the front wheel brake circuit 4 or rear wheel brake circuit 10, the inlet valve 6 is opened in a time-limited fashion corresponding to the demand of the slip regulator which is integrated in the control unit 8. The hydraulic volume required for the build-up of pressure is provided by the pump 9.

Outside the brake slip regulation, on account of the hydraulic circuit concept, in the event of an actuation (in proportion to a foot force) of the master brake cylinder 13 which is connected to the rear wheel brake circuit 10, only the rear wheel brake 14 is pressurized proportionally in terms of force, that is to say the front wheel brake circuit 4 remains unpressurized until an actuation (in proportion to a hand force) of the master brake cylinder 7 which is connected to the front wheel brake circuit 4.

A peculiarity of the proposed motorcycle brake system as per FIG. 1 is that, in the event of a force-proportional actuation of the front wheel brake circuit 4, the rear wheel brake 14 is autonomously co-braked as a result of a suitable pump activation. For this purpose, the pump 9 extracts pressure medium from the master brake cylinder 13 via the electrically opened switching valve 20, and feeds said pressure medium to the rear wheel brake 14. Here, the cut-off valve 19 remains, electrically actuated, in the closed position, thereby ensuring that the pump pressure does not escape into the master brake cylinder 13.

Secondly, on account of the two-circuit design of the pump 9 and the associated simultaneous build-up of pressure in the two brake circuits, a feedback of the pump pressure to the brake circuit which has the hand-actuated master brake cylinder 7 is undesirable and must therefore be prevented in the event of an autonomous and therefore externally-activatable build-up of pressure in the non-manually-actuated brake circuit, for which reason, according to aspects of the invention, as per FIGS. 1-4, a valve circuit is proposed which prevents a feedback of the pump pressure to the manually actuated master brake cylinder.

The pump 9 of the improved motorcycle brake system according to FIG. 1 therefore has, for each brake circuit, a valve circuit with different suction valves 24, 25, with the suction valve 25 which is arranged in the exclusively manually-actuable brake circuit (front wheel brake circuit 4) having a significantly higher opening pressure (approx. 1.2 bar) than the suction valve 24 which is arranged in the autonomously actuable brake circuit (rear wheel brake circuit 10) and whose opening pressure is preferably approximately 0.2 bar. It is hereby ensured that, in the event of an autonomous build-up of pressure, which is triggered by means of the pump 9, in the non-manually-actuated rear wheel brake circuit 10, a feedback of the pump pressure to the manually-actuated master brake cylinder 7, which is connected to the front wheel brake circuit 4, is simultaneously considerably reduced.

Figure 2:
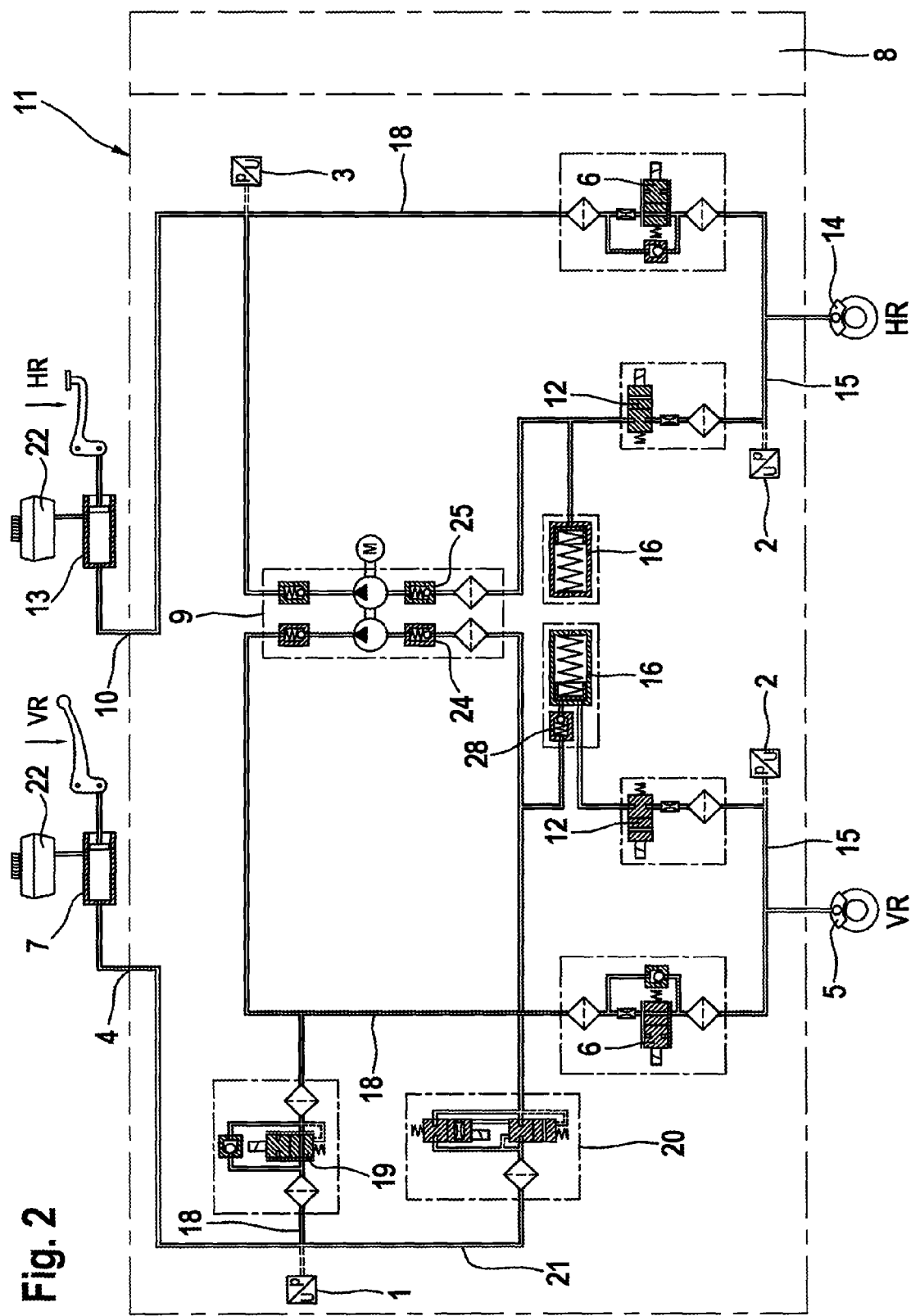
FIG. 2 shows a hydraulic circuit diagram for a motorcycle brake system in an embodiment which differs from FIG. 1 and whose front wheel brake circuit is provided with the cut-off valve and switching valve known from FIG. 1, such that during autonomous operation of the front wheel brake circuit, a feedback from the pump to the master brake cylinder which is provided with the hand brake lever is prevented.

The hydraulic circuit according to FIG. 2 shows a modification, according to aspects of the invention, of the circuit arrangement according to FIG. 1, with the rear wheel brake circuit arrangement known from FIG. 1 having been transferred, with regard to the cut-off valve 19 and switching valve 20 and also with regard to the pressure holding valve 28, to the front wheel brake circuit 4. Accordingly, the two pump suction valves 24, 25 in the two brake circuits have also been exchanged. The pump suction valve 25 which is provided with the higher opening pressure is therefore situated in the rear wheel brake circuit 10, as a result of which, in autonomous brake system operation, the feedback of the pump pressure to the foot-actuated master brake cylinder 13 is minimized. Furthermore, in FIG. 2, in contrast to FIG. 1, the pressure retaining valve 28 has now been removed from the rear wheel brake circuit and has been arranged for this purpose at the outlet side on the low-pressure accumulator 16 of the front wheel brake circuit 4, which contributes to the secondary circuit ventilation in the rear wheel brake circuit 10 being facilitated. Specifically, in the rear wheel brake circuit 10, the low-pressure accumulator 16 is connected directly to a branch of the return line 15, while the low-pressure accumulator 16 which is arranged in the front wheel brake circuit 4 is advantageously rinsed in the direction of the pressure holding valve 28 via the return line 15.

Autonomous operation of the motorcycle brake system according to FIG. 2 accordingly takes place by means of the actuation (in proportion to a foot force) of the master brake cylinder 13 which is connected to the rear wheel brake circuit 10, as a result of which, according to the known schematic diagram (compare FIG. 1), the cut-off valve 19 and switching valve 20 which are arranged in the front wheel brake circuit 4 now assume the electromagnetically excited switched position (not shown) in which the pump circuit which is connected to the front wheel brake circuit 4 is connected at the suction side to the master brake cylinder 4, but is separated at the pressure side from the master brake cylinder 4, while the pump circuit which is connected to the rear wheel brake circuit 10, as a result of the increased opening pressure of the suction valve 25, minimizes the pump feedback to the master brake cylinder 13. Moreover, since the master brake cylinder 13 in FIG. 2 is actuated by means of a brake pedal in proportion to a foot force, as a result of the selected brake circuit distribution, any pump feedback to the master brake cylinder 13 is barely perceptible, or not perceptible at all, to the rider.

Figure 3:
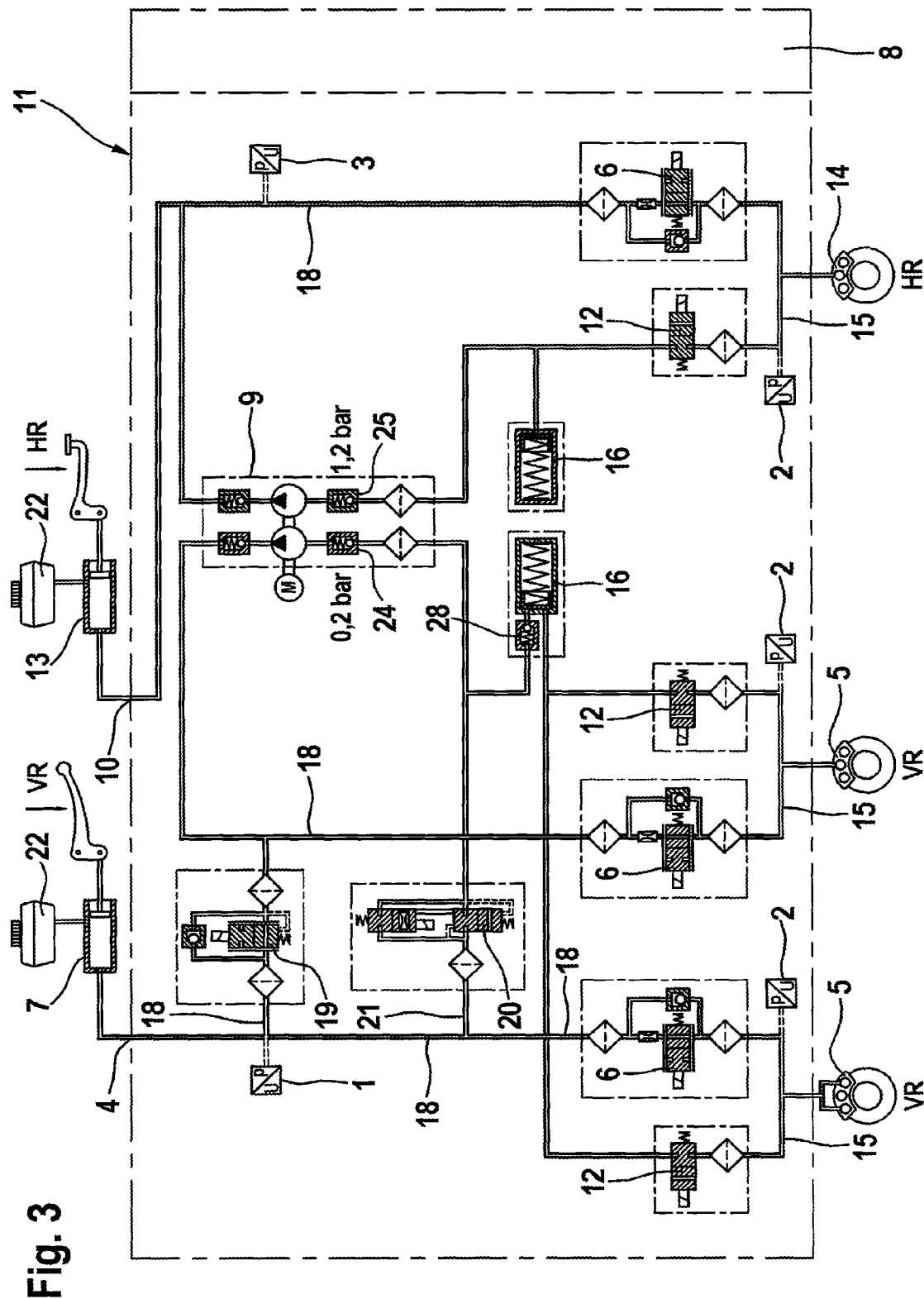
FIG. 3 shows the hydraulic circuit diagram according to FIG. 2, expanded by a second front wheel brake or alternatively by a front wheel brake with a plurality of wheel brake cylinders which can be actuated independently of one another and which, by means of a division of the brake line which is connected to the front wheel brake circuit between two front wheel brakes or between the wheel brake cylinders which can be actuated independently of one another, are connected to the hand-actuable master brake cylinder.

The hydraulic circuit according to FIG. 3 shows an expansion, according to aspects of the invention, of the circuit arrangement according to FIG. 2, wherein in the embodiment, according to aspects of the invention, as per FIG. 3, the front wheel brake 5 has either two brake calipers which are functionally separate from one another, or a multi-piston brake whose brake pistons are connected to the front wheel brake circuit 4 independently of one another by means of a two-part brake line 18. In FIG. 3, therefore, the autonomously regulable front wheel brake 4 known from FIG. 2 is expanded in the direction of the symbolically illustrated second front wheel brake 5 by a line branch in which, for brake slip regulation, an inlet valve 6 is arranged upstream of the second front wheel brake 5 and an outlet valve 12 of the already-specified type is arranged downstream of the second wheel brake 5 in a further return line 15. The line branch is branched off at the brake line 18 of the front wheel brake circuit 4 upstream of the cut-off valve 19 and switching valve 20, such that the symbolically illustrated second front wheel brake 5 cannot be autonomously regulated but rather can only be manually actuated. This has the advantage that, during autonomous brake pressure regulation in the first front wheel brake 5, a comfortable braking intervention into the front wheel brake circuit 4 is possible since a brake pressure may be built up, unhindered, in the symbolically illustrated second front wheel brake 5.

In the present exemplary embodiment according to FIG. 3, therefore, one of the two front wheel brakes 5 can be actuated only manually by means of the master brake cylinder 7, such that a comfortable brake actuation sensation is perceptible at the brake lever of the master brake cylinder 7 at all times.

In FIG. 3, the design of the rear wheel brake circuit 10 corresponds, in terms of all the substantial elements, to the illustration of the rear wheel brake circuit 10 according to FIG. 2.

As depicted by way of example in FIG. 3, the rear wheel brake 14 may also be designed as a multi-piston brake, which pistons are all connected by means of the brake line 18 of the rear wheel brake circuit 10 to the second master brake cylinder 13.

Figure 4:
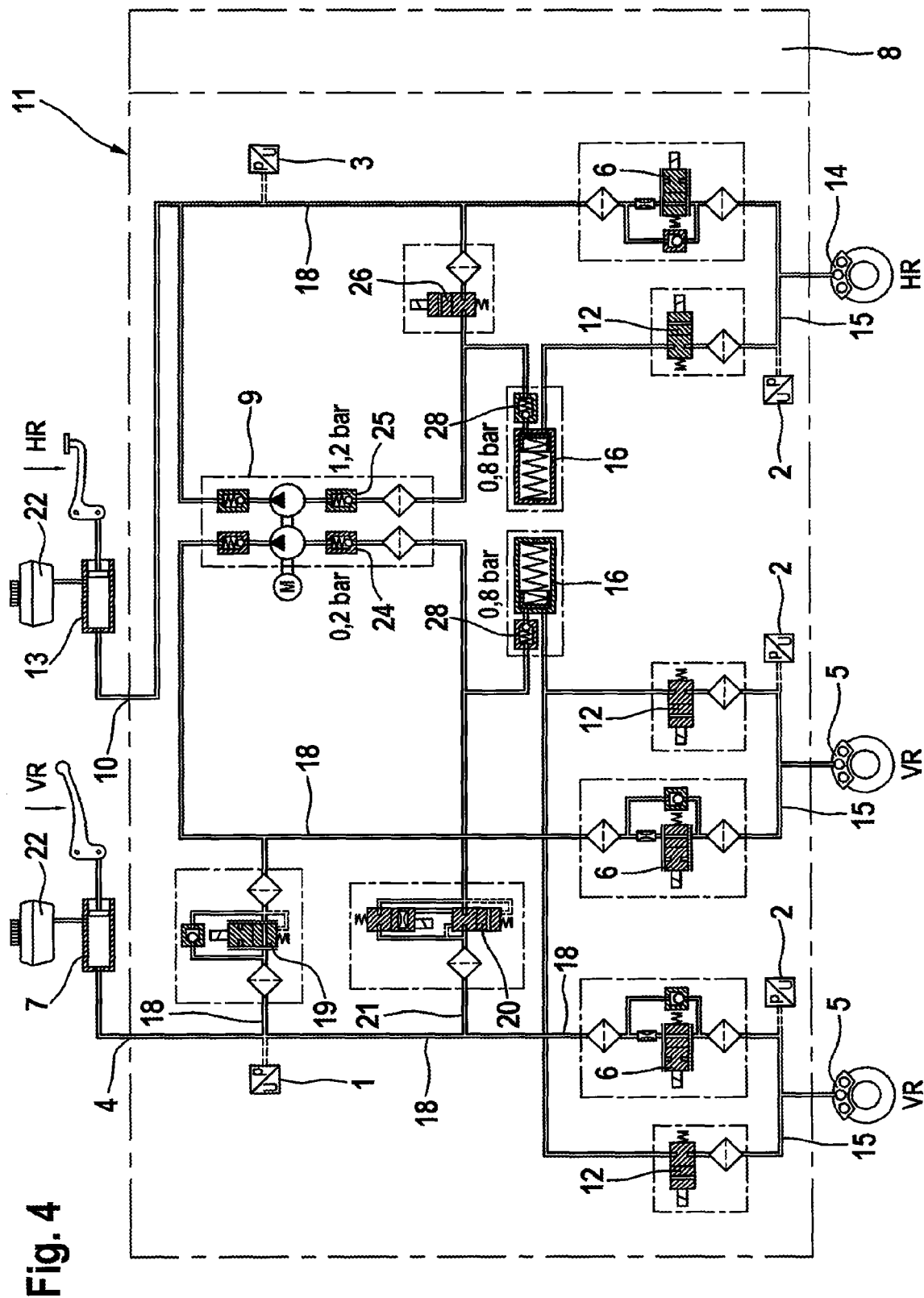
FIG. 4 shows the hydraulic circuit diagram according to FIG. 3, additionally with a line connection between the brake line of the rear wheel brake circuit and the pump suction path in which a check valve is arranged.

As a further expedient distinguishing feature with respect to FIG. 1, the circuit arrangements according to FIGS. 2, 3, 4 have a pump 9 whose pump suction valve 24 which is arranged in the front wheel brake circuit 4 has a significantly lower opening pressure (approx. 0.2 bar) than the further pump suction valve 25 (approx. 1.2 bar) which is arranged in the rear wheel brake circuit 10, as a result of which a so-called idle pulsation of the pump 9 in the rear wheel brake circuit 4 in the direction of the second master brake cylinder 7 is advantageously prevented, as a result of which the foot brake lever of said second master brake cylinder can be actuated without feedback.

The hydraulic circuit according to FIG. 4 differs from the circuit arrangement according to FIG. 3 substantially by two further additional features, wherein in addition:

1. A line which is provided with a check valve 26 connects the brake line 18 of the rear wheel brake circuit 10 to the pump suction path in the rear wheel brake circuit 10, 2. The two low-pressure accumulators 16 are provided with pressure retaining valves 28 which have an identical opening pressure (approx. 0.8 bar).

In contrast to FIG. 1, in the circuit diagrams according to FIGS. 2 to 4, the front wheel brake circuit can in each case be autonomously regulated as a function of the manual actuation of the rear wheel brake circuit, with a pressure sensor 2 being arranged both at the rear wheel brake 14 and also at the front wheel brake in order to precisely detect the brake pressure prevailing in each case at the rear wheel brake 14 and also at the front wheel brake, in particular for brake slip regulation in the two brake circuits.

Where no explanation has thus far been given regarding all the further details which can be seen from FIGS. 2 to 4, said details correspond functionally and in terms of design to the discussed circuit diagram according to FIG. 1, with all the figures having the same reference symbols for identical elements.

In summary, it can therefore be stated for all the exemplary embodiments according to FIGS. 1-4 that, according to aspects of the invention, in that brake circuit which does not have the cut-off valve 19 and switching valve 20, the pump suction valve 25 has a higher opening pressure than the pump suction valve 24 which is arranged in that brake circuit which has the cut-off valve 19 and switching valve 20.

In this way, during autonomous operation of the motorcycle brake system, a pulsating feedback from the pump 9 to the hand-actuated or foot-actuated master brake cylinder 7; 13 is prevented in that brake circuit which does not have a cut-off valve 19 and switching valve 20.

As a result, corresponding to the exemplary embodiment according to FIG. 1, in the front wheel brake circuit 4 which does not have the cut-off valve 19 and switching valve 20, the pump suction valve 25 has a higher opening pressure than the pump suction valve 24 which is arranged in the rear wheel brake circuit 10 and which has the cut-off valve 19 and switching valve 20.

Alternatively, FIG. 2 shows an exemplary embodiment in which, in the rear wheel brake circuit 10 which does not have the cut-off valve 19 and switching valve 20, the pump suction valve 25 has a higher opening pressure than the pump suction valve 24 which is arranged in the front wheel brake circuit 4 which is provided with the cut-off valve 19 and switching valve 20.

In an expansion of FIG. 2, FIG. 3 shows that that brake circuit (front wheel brake circuit 4) which has the cut-off valve 19 and switching valve 20 has connected to it, upstream of the cut-off valve 19 and switching valve 20, a further wheel brake (front wheel brake 5) or a separately actuable brake piston, as a result of which a brake lever sensation which is desired for a conventional brake actuation is ensured at the depicted brake lever by means of the master brake cylinder 7 which is connected to the front wheel brake circuit 4 (as a result of the volume uptake of the further wheel brake or brake piston).

FIG. 4 finally shows, on account of the arrangement of a pressure retaining valve 28 at the outlet of the low-pressure accumulator 16, an expedient measure for evacuating the secondary circuit, for which purpose a check valve 26, which opens under the action of an electromagnet, is connected to the brake line of the rear wheel brake circuit upstream of the inlet valve 6, which check valve 26 can be connected to the suction side of the pump 9 downstream of the pressure retaining valve 28.

With regard to the design of the pump 9, it should be noted for all exemplary embodiments that the difference in the opening pressures of the two pump suction valves 24, 25 is between 0.5 and 1.5 bar, preferably 1 bar. The opening pressure of the pump suction valve 24 which is arranged in that brake circuit which has the cut-off valve 19 and switching valve 20 is between 0.1 and 0.4 bar, preferably 0.2 bar, in order to obtain as high a delivery capacity as possible. In contrast, the opening pressure of the pump suction valve 25 which is arranged in that brake circuit which does not have the cut-off valve 19 and switching valve 20 is between 0.6 and 1.6 bar, preferably 1.2 bar, as a result of which, on account of the reduction of the pump suction behavior, pressure pulsations are not perceptible at the hand-actuated or foot-actuated master brake cylinder 7, 13.

In the simplest embodiment, the two pump suction valves 24, 25 are designed as non-return valves, preferably non-return ball valves, which are closed by spring force in the home position and which can be opened hydraulically. Electromagnetic suction valve control would theoretically also be conceivable.

In all exemplary embodiments, the pump 9 is designed as a piston pump whose pump pistons are combined with the two pump suction valves 24, 25 in the block-like brake unit 11 which serves to accommodate the inlet and outlet valves 6, 12, the cut-off valve 19 and switching valve 20, the pressure sensors 1, 2, 3 and the two low-pressure accumulators 16.

With regard to the two low-pressure accumulators 16, it should be noted in all exemplary embodiments that, in each case, that low-pressure accumulator 16 which is arranged in the brake circuit which does not have the cut-off valve 19 and switching valve 20, does not require a pressure retaining valve 28, which promotes the secondary circuit ventilation and the structural expenditure in said region.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A motorcycle brake system comprising:
a hydraulically actuable front wheel brake circuit and rear wheel brake circuit;
two master brake cylinders for the independent actuation of the two brake circuits;
an inlet valve and an outlet valve provided for brake pressure regulation in each brake circuit;
a two-circuit pump for the supply of pressure to the front wheel and rear wheel brake circuits;
a pump suction valve and a pump pressure valve in each brake circuit;
a low-pressure accumulator connected upstream of each of the pump suction valves;
a front wheel brake in the front wheel brake circuit and a rear wheel brake in the rear wheel brake circuit; and
a cut-off valve and a switching valve in one of the brake circuits which can be acted on by a feed pressure of the pump independently of an actuation of the master brake cylinder assigned to the wheel brake of said one of the brake circuits,
wherein the pump suction valve has a higher opening pressure in the brake circuit that does not have the cut-off valve and switching valve than the pump suction valve that is arranged in the brake circuit that has the cut-off valve and the switching valve.

2. The motorcycle brake system as claimed in claim 1, wherein, in interaction with the inlet and outlet valves, the cut-off valve and the switching valve are configured to bring about a build-up of brake pressure in said one of the brake circuits.

3. The motorcycle brake system as claimed in claim 1, wherein the front wheel brake circuit does not have the cut-off valve and the switching valve and the rear wheel brake circuit has the cut-off valve and the switching valve.

4. The motorcycle brake system as claimed in claim 1, wherein the rear wheel brake circuit does not have the cut-off valve and the switching valve and the front wheel brake circuit has the cut-off valve and the switching valve.

5. The motorcycle brake system as claimed in claim 1, wherein the difference in the opening pressures of the two pump suction valves is between 0.5 and 1.5 bar.

6. The motorcycle brake system as claimed in claim 5, wherein the difference in the opening pressures of the two pump suction valves is approximately 1 bar.

7. The motorcycle brake system as claimed in claim 1, wherein the opening pressure of the pump suction valve which is arranged in the brake circuit which has the cut-off valve and switching valve is between 0.1 and 0.4 bar.

8. The motorcycle brake system as claimed in claim 7, wherein the opening pressure of the pump suction valve which is arranged in the brake circuit which has the cut-off valve and switching valve is approximately 0.2 bar.

9. The motorcycle brake system as claimed in claim 1, wherein the opening pressure of the pump suction valve which is arranged in the brake circuit which does not have the cut-off valve and switching valve is between 0.6 and 1.6 bar.

10. The motorcycle brake system as claimed in claim 9, wherein the opening pressure of the pump suction valve which is arranged in the brake circuit which does not have the cut-off valve and switching valve is approximately 1.2 bar.

11. The motorcycle brake system as claimed in claim 1, wherein the two pump suction valves are non-return valves which are closed by spring force in a home position and which can be opened hydraulically.

12. The motorcycle brake system as claimed in claim 11, wherein each non-return valve is a non-return ball valve.

13. The motorcycle brake system as claimed in claim 1, wherein the pump is a double-flow piston pump having two pump pistons that are combined with the two pump suction valves in a single brake unit which serves to accommodate a plurality of inlet and outlet valves, the cut-off valve, the switching valve, a plurality of pressure sensors and the two low-pressure accumulators.

14. The motorcycle brake system as claimed in claim 1, wherein the brake circuit which has the cut-off valve and the switching valve has a further wheel brake which can be actuated by the master brake cylinder which is connected to said brake circuit.

15. The motorcycle brake system as claimed in claim 14, wherein the further wheel brake is connected to said brake circuit upstream of the cut-off valve and the switching valve.

16. The motorcycle brake system as claimed in claim 14, wherein the brake pressure in the further wheel brake can be regulated by inlet and outlet valves.

\* \* \* \* \*